United States Patent [19]

Cardoza et al.

[11] 4,333,839

[45] Jun. 8, 1982

[54] FILTER SYSTEM WITH IMPROVED BLOWDOWN COLLECTION AND RECIRCULATION MEANS

[75] Inventors: Richard E. Cardoza, Tiburon; William D. Crowe, San Francisco, both of Calif.

[73] Assignee: J. R. Schneider Co., Inc., Corte Madera, Calif.

[21] Appl. No.: 210,478

[22] Filed: Nov. 26, 1980

[51] Int. Cl.³ ............................................. B01D 37/02
[52] U.S. Cl. .................................. 210/777; 210/798; 210/193; 210/411
[58] Field of Search ............................. 210/777–779, 210/798, 168, 193, 411, 412

[56] References Cited

U.S. PATENT DOCUMENTS

| | | | |
|---|---|---|---|
| 3,351,551 | 11/1967 | Sines | 210/411 X |
| 3,679,052 | 7/1972 | Asper | 210/193 X |
| 3,935,105 | 1/1976 | McEwen | 210/193 X |
| 3,957,636 | 5/1976 | Arvanitakis | 210/193 X |
| 4,277,337 | 7/1981 | Zdansky | 210/193 X |

*Primary Examiner*—John Adee

[57] ABSTRACT

A system for filtering liquids, such as coolant liquid from process machinery. The system includes an improved liquid storage tank having a partition dividing the tank into a clean tank for receiving clean liquid from a filter for return to the process machinery, and a dirty tank for receiving process or dirty liquid from process machinery. The storage tank further includes a second partition forming a blowdown chamber and a recirculation chamber below the blowdown chamber, the two chambers being coupled together by a valve which can be opened and closed depending upon the cycle of operation of the system. The recirculation chamber is coupled by a filter pump to the inlet of the filter. The filter has a return line to the clean tank and a blowdown line to the blowdown chamber. The blowdown chamber has a conical bottom and the recirculation chamber has a sidewall provided with tangential inlet ports communicating with the dirty tank. A swirling liquid movement is created in the recirculation chamber when the filter pump is actuated during the pre-coat and filtration cycles of the system in which the valve between the blowdown and recirculation chambers is open. During the initial and final stages of blowdown, the valve is closed and the liquid and particulates from the filter during the blowdown cycles is retained in the blowdown chamber. Since the particulates caused by the blowdown are retained in the blowdown chamber, the particulates cannot enter the dirty tank for possible overflow with dirty liquid into the clean tank. In this way, the clean tank remains free of particulates.

10 Claims, 14 Drawing Figures

FIG. I

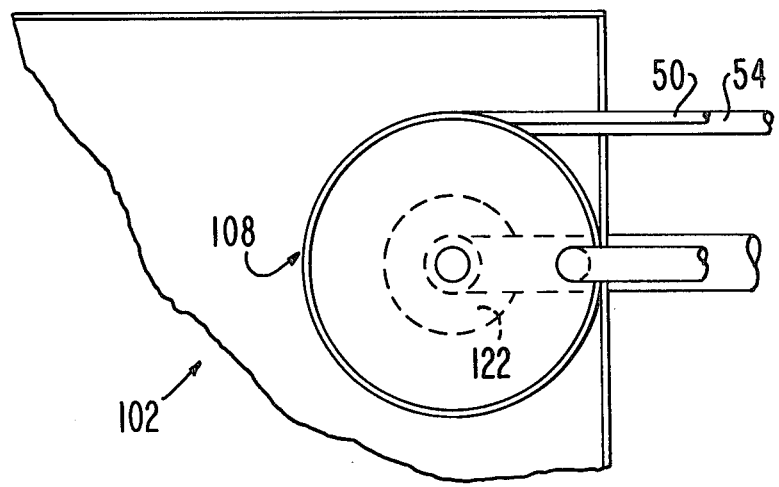
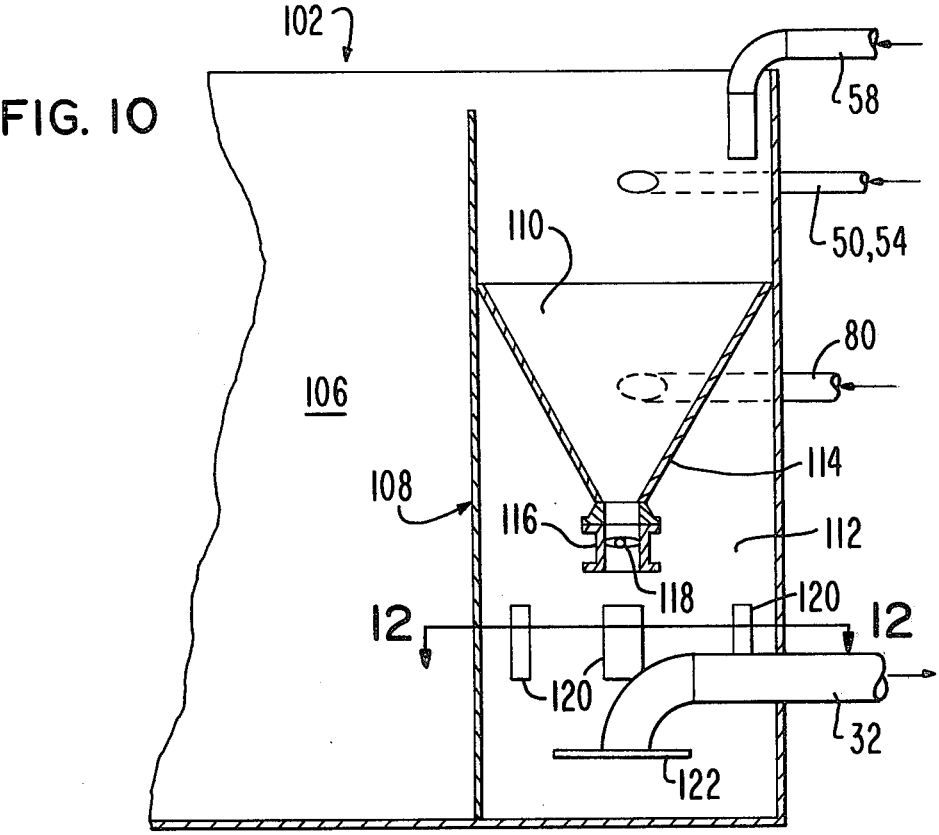

FILTER SYSTEM WITH IMPROVED BLOWDOWN COLLECTION AND RECIRCULATION MEANS

This invention relates to improvements in the filtration of coolant/lubricant liquids for process machinery, and more particularly, to apparatus and method for keeping such liquids substantially free of particulates before such liquid is directed to process machinery.

BACKGROUND OF THE INVENTION

Over the years, much effort has been expended in designing industrial filters, such as horizontal plate filters, in such a way as to minimize migration of filter aids and particulates through the filter media used in the filters. The presence of such highly abrasive particulates in a coolant delivered to precision machines, such as rolling mills or the like, is highly detrimental to the machines themselves and also to the resultant quality of the products made from the machines. In a large measure, these efforts to prevent particulate migration to the filter medium have been successful to the point that, in a well designed filtration, system, migration of particulates through the filter media is no longer considered to be a problem during normal operation. Recent investigations, however, have shown that coolant delivered to the process machinery coupled to a filtration system during the period of filter cleaning or blowdown contains particulate materials which are higher in concentrations than that which the in-line filter itself delivers to the machinery.

Further analyses and field inspections of standard divided liquid storage tanks of a system of this type leads to the conclusion that residual particulate materials are returned to the dirty tank portion of the storage tank during blowdown cycles, thence, over the partition dividing the dirty tank from the clean tank, and then on to the process machinery. The result is excessive wear to the machinery and the degradation of the quality of the products made with the machines.

Because of this problem, a need has arisen for apparatus and a method for isolating filter blowdown liquid from the main tankage system to prevent the carryover of residual particles to the process liquid during the time in which the filter is off-line for cleaning or for filter replacement purposes.

SUMMARY OF THE INVENTION

The present invention satisfies the aforesaid need by providing an improved apparatus and method for receiving blowdown liquid and particulates in such a way that the liquid and particulates are isolated from the dirty tank of the storage tank unit and such particulates can be returned to the filter system during pre-coat and filtration cycles without entering the drity tank at any time. To this end, the invention includes a blowdown chamber above a recirculation chamber, the blowdown chamber being isolated from the dirty tank adjacent thereto and the recirculation chamber being coupled by tangential inlet ports to the dirty tank. A valve controls fluid flow from the upper, blowdown chamber to the lower recirculation chamber. Thus, during pre-coat and filtration cycles, the valve between the two chambers is open and a liquid swirling action is created in the recirculation chamber before the liquid containing particulates from the blowdown chamber are recirculated to the filter. This assures there will only be a liquid inflow from the dirty tank to the recirculation tank to prevent any particulates from passing in the opposite direction from the recirculation tank into the dirty tank and causing a turbulence which would otherwise keep the particulates in the dirty tank in suspension.

During the initial and final blowdown stages, blowdown liquid and particulates are kept in the blowdown chamber because the valve between the chambers is closed. There will be no migration of the particulates from the blowdown chamber to the dirty tank because there is no communication between them. Clean processed liquid returned from the filter will enter the clean tank and then be directed out of the clean tank to the process machinery. Any overflow from the dirty tank into the clean tank will allow for substantially no transfer of particulates into the clean tank from the dirty tank because any particulates directed into the dirty tank from the input line from the machinery will gravitate to the bottom of the dirty tank and will not be in suspension and thereby in condition for overflow because of the quiescent nature of the liquid in the dirty tank.

The primary object of the present invention is, therefore, to provide an improved apparatus and method for isolating filter blowdown liquid from the main tankage system of an industrial filter system to prevent carryover of residual particulates in the filter blowdown liquid to the process liquid during the time when the filter is off-line for cleaning or replacement of the filter medium.

Another object of the present invention is to provide an improved apparatus and method of the type described wherein a blowdown liquid and particulates are kept isolated at all times from the main tankage system and are circulated through the filter only during pre-coat and filtration cycles, thereby preventing the particulates from entering the process liquid and returning to the machinery.

Other objects of this invention will become apparent as the following specification progresses, reference being had to the accompanying drawings for an illustration of the invention.

IN THE DRAWINGS

FIG. 10 is an enlarged fragmentary schematic view of a part of the improved storage tank of the present invention;

FIG. 11 is a top plan view of the portion of the improved storage tank shown in FIG. 10;

Figure 1:
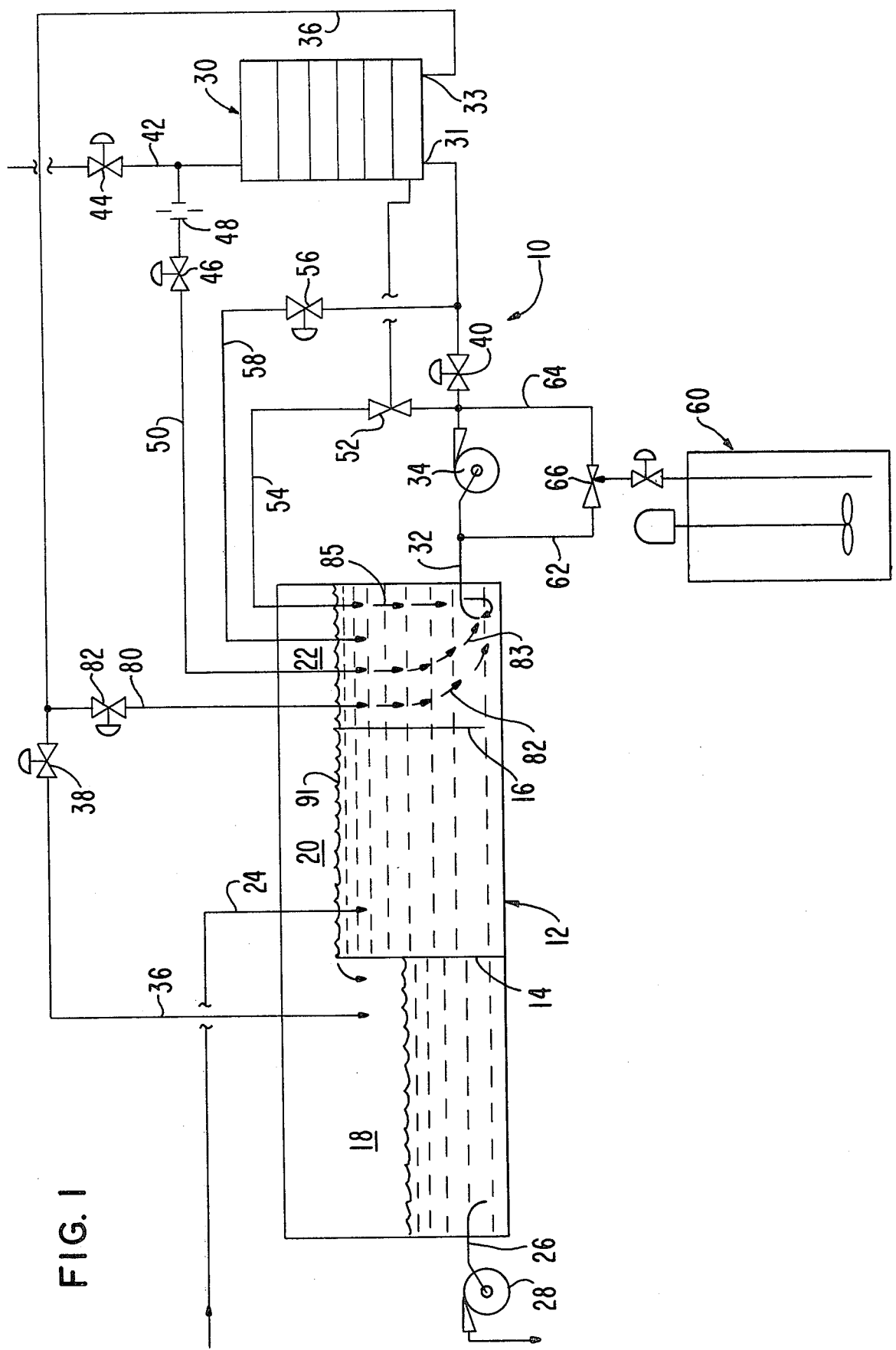
FIG. 1 is a schematic view of a filtration system of the prior art, showing a standard divided storage tank for clean and dirty process liquid, the tank being coupled to a filter comprised of a series of stacked filter plates, the diagram showing the flow of liquid into and out of the recirculation chamber of the storage tank during a pre-coat cycle.

A conventional filtration system is shown schematically in FIGS. 1–4 and is broadly denoted by the numeral 10. System 10 includes a divided storage tank 12 having partitions 14 and 16 for dividing the interior of the tank into three different parts, namely a clean tank 18, a dirty tank 20, and a recirculation chamber 22. Partitions 14 and 16 are spaced below the top of tank 12 and partition 16 is spaced above the bottom of tank 12. Dirty liquid to be filtered by system 10 arrives in the dirty tank 20 along a line 24. Clean liquid from system 12 leaves the system along line 26 through a supply pump 28.

System 10 further includes a filter 30 having an inlet 31 coupled by a line 32 and a filter pump 34 to recirculation chamber 22. Fluid flowing out of the filter through an outlet 33 passes along line 36 to the clean tank through an outlet valve 38. An inlet valve 40 is in line 32. Blowdown air passes through a line 42 to filter 30 and is controlled by a blowdown valve 44 in line 42. A bleed valve 46 and a bleed orifice 48 are in a line 50 leading from line 42 to recirculation chamber 22. A vacuum eductor 52 in a line 54 is also coupled between filter 30 and the recirculation chamber 22. Finally, a drain valve 56 in line 58 couples line 32 and thereby the filter inlet of filter 30 with the recirculation chamber 32. Means for admitting a filter aid, such as diatomaceous earth, is broadly denoted by the numeral 60 and is coupled by lines 62 and 64 by means of an eductor 66 to line 32.

Figure 5:
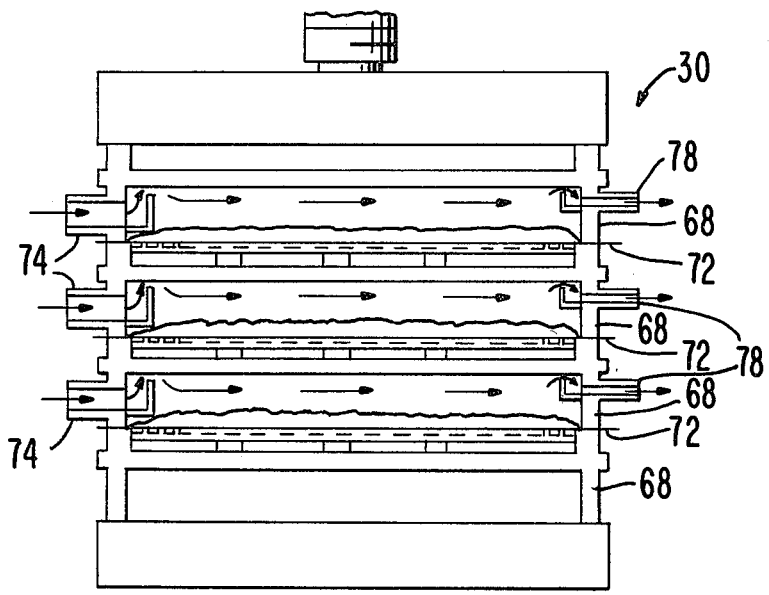
FIGS. 5-8 are schematic views of the filter during, respectively, the pre-coat, filtration, the first blowdown stage and the final blowdown stage.
Figure 6:
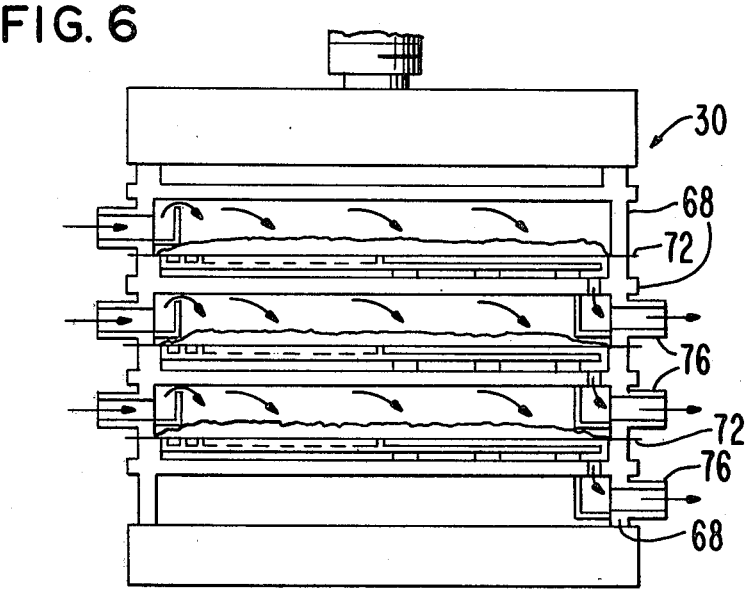
Figure 7:
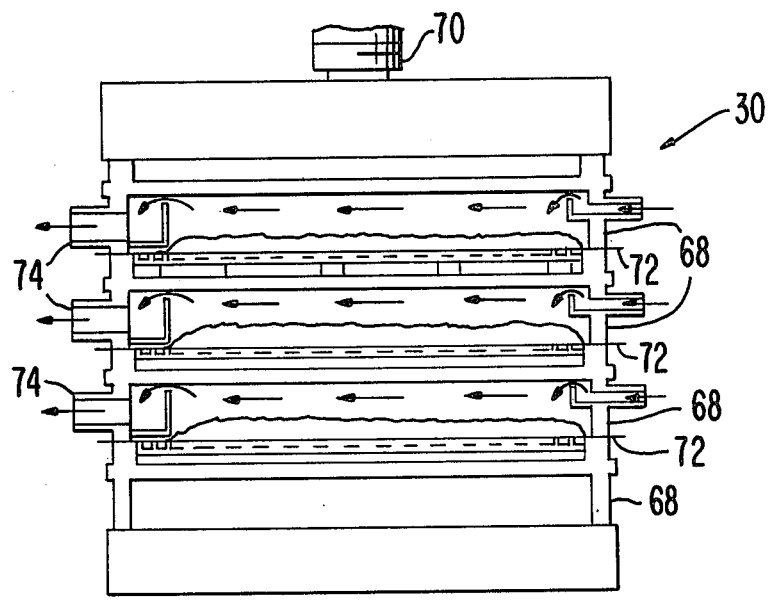
Figure 8:
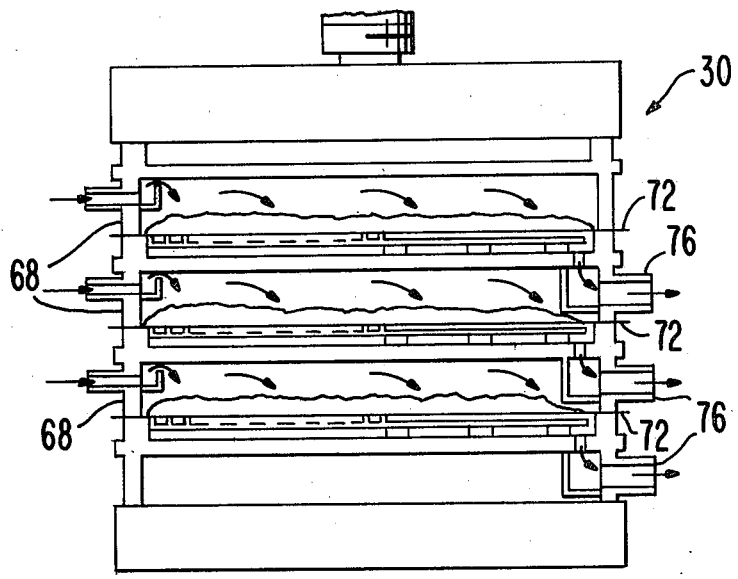
Figure 9:
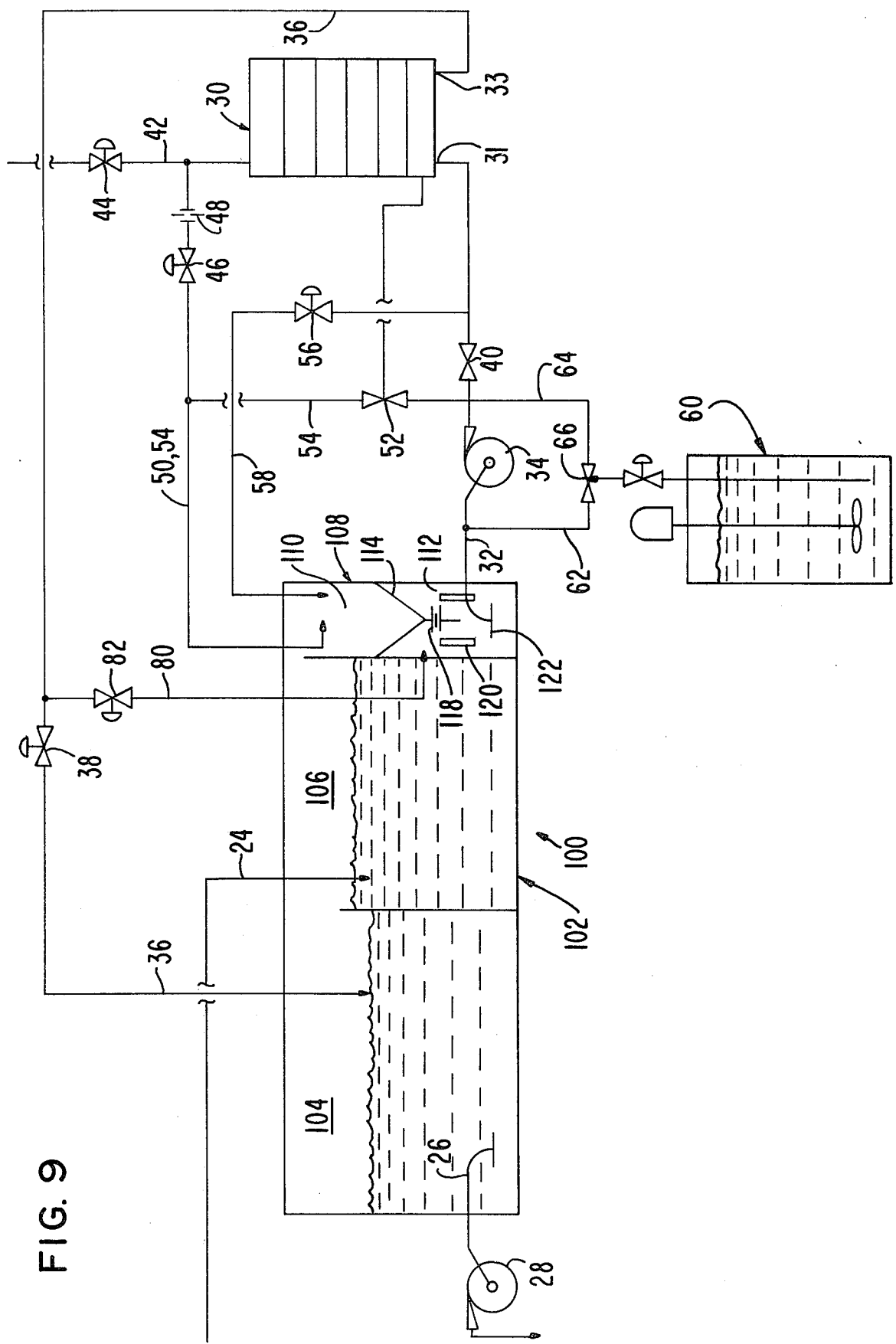
FIG. 9 is a view similar to FIG. 1 but showing a schematic diagram of the improved filtration system of the present invention.

Filter 30 is of the type shown in FIGS. 5–8 and is comprised of a plurality of vertically stacked filter plates 68 which can be separated by the action of a closing screw 70 which is conventional in construction. Each pair of adjacent plates 68 has a filter medium 72 therebetween for filtering dirty liquid entering the filter inlet ports 74 to emerge as clean liquid from the filter outlet ports 76 (FIG. 6).

All of the foregoing elements of system 10 in combination with each other are conventional in construction. Typically, they operate in four different cycles, namely the pre-coat cycle, the filtration cycle, the initial blowdown cycle, and the final blowdown cycle. These four cycles are shown schematically by arrows representing fluid flows in FIGS. 5–8, respectively.

In the pre-coat cycle, a thin coating of a diatomaceous earth or other filter aid is applied to the filter medium 72 (FIG. 5) by directing the fluid in recirculation chamber 22 through filter pump 34 and inlet valve 40 and into the filter inlet ports 74. During this pre-coat cycle, there will be a constant discharge of air, dirty liquid and filter aid out of the interior of the filter through supplementary outlet ports 78 (FIG. 5). This discharge will pass along line 36 to a line 80 (FIG. 1) through a recirculation valve 82, valve 38 being closed during this time so that no discharge is directed into clean tank 18. The fluid in line 80 will discharge into recirculation chamber 22 as denoted by arrows 82. During the pre-coat cycle, the filter aid will be spread over the filter medium and will reduce the effective opening size of the filter medium to a range of typically 1 micrometer from the maximum effective opening of the filter medium itself, such as 30 micrometers.

In normal practice during the pre-coat cycle, the liquid flow through the filter is greatly reduced. Experience has shown that this feature allows a more rapid and even distribution of the filter aid on the filter medium itself. During the pre-coat cycle, a portion of the filter aid will be returned from filter 30 to recirculation chamber 22 along lines 50 and 54 in addition to flow along line 80 and enter chamber 22 as denoted by arrows 83 and 85 (FIG. 1).

Recirculation chamber 22 must be of relatively large volume to prevent vortices or undue pressure loss at the inlet of filter pump 34. As a result of reduced flow through chamber 22 during the pre-coat cycle, some of the filter aid will settle out and collect on the bottom and in the corners of the recirculation chamber 22, the latter ordinarily being of square or rectangular cross section for economy of construction. Some additional filter aid will flow under partition 16 and settle on the bottom of dirty tank 20.

Figure 2:
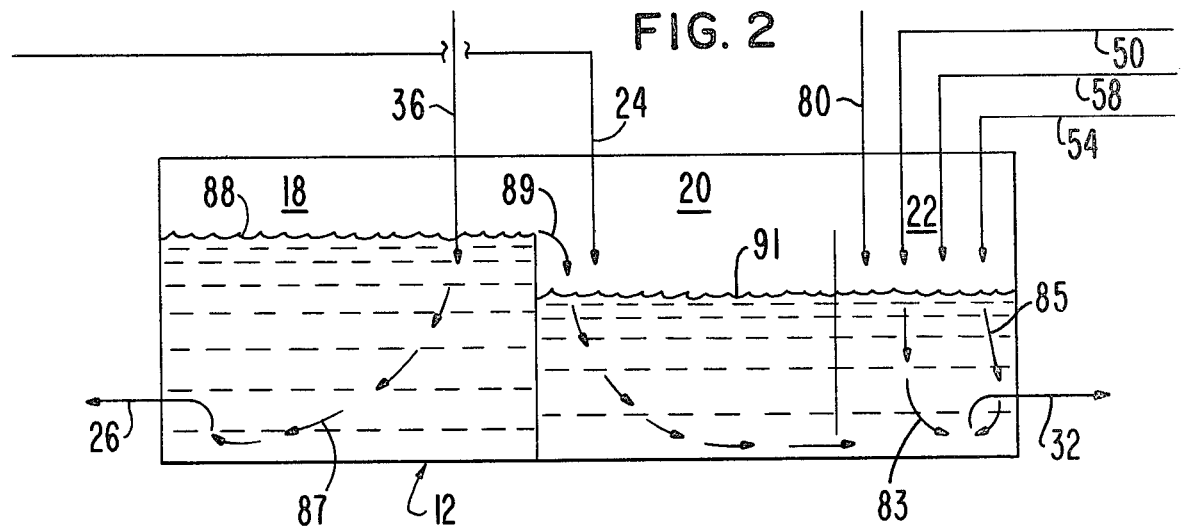
FIG. 2 is a fragmentary view similar to FIG. 1 but showing the flow through the divided storage tank after pre-coating and during filtration by the filter.

FIG. 2 shows the liquid flows and liquid levels in divided storage tank 12 during the filtration cycle. The main flow of clean liquid from the filter during this cycle flows through outlet valve 38 which is open and along line 36 into clean tank 18 as denoted by arrows 87 (FIG. 2). In this cycle, filter pump 34 continues to pump the liquid from recirculation chamber 22 through line 32 to the filter inlet 31. Valve 56 is closed while bleed valve 46 is open so that some liquid returns from the filter to the recirculation chamber along lines 50 and 54. Arrows 83 and 85 (FIG. 2) indicate this flow into chamber 22.

The main flow of the liquid from filter 30 is delivered to clean tank 18 at a higher rate than the process demand so that some clean liquid overflows into the dirty tank 20 as indicated by arrow 89 (FIG. 2) to prevent flow of dirty liquid into the clean tank. This is also indicated by showing the upper level 88 of clean liquid in tank 18 as being at the height of partition 14.

Some filter aid will be returned to chamber 22 through the vacuum eductor along line 54 and the bleed valve along line 50, and the filter aid will settle out in chamber 22 due to the low pump inlet velocities described above. During this cycle, little or no filter aid will be delivered to the clean tank and thence to the process, assuming integrity of the filter medium and the pre-coating of the filter medium.

Figure 3:
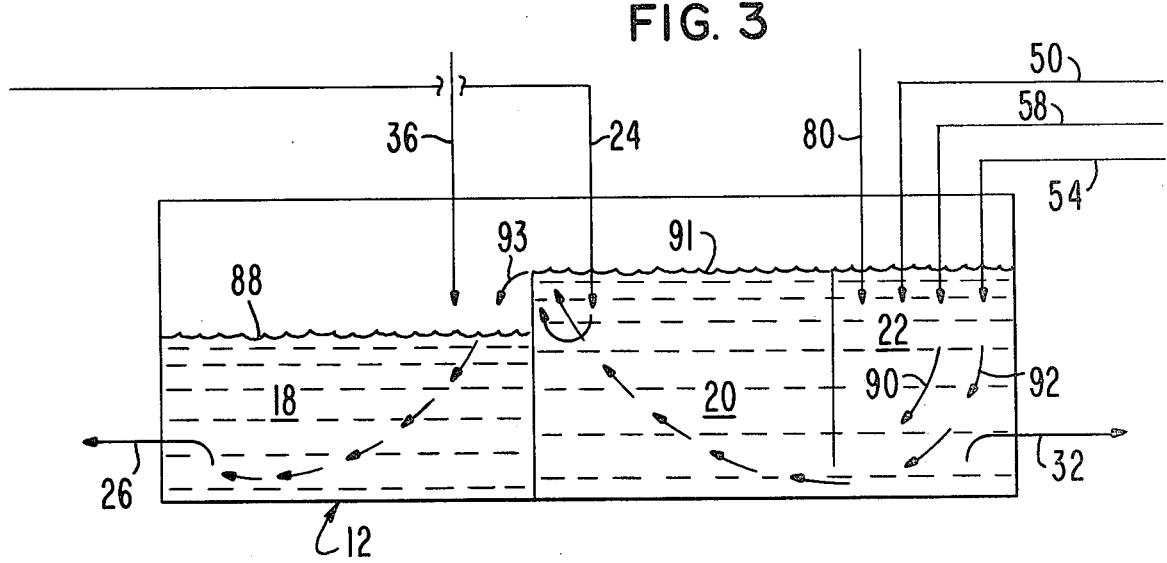
FIG. 3 is a view similar to FIGS. 1 and 2 but showing the flow through the divided storage tank during the first stage of the blowdown cycle.

In the first stage of blowdown, blowdown valve 44 (FIG. 1) is opened to allow air to be forced along line 42 into filter 30. During this cycle (FIG. 7), inlet valve 40 from filter pump 34 and bleed valve 46 are closed while drain valve 56 is open. Outlet valve 38 and recirculation valve 82 are also closed. Thus the return flow of air and some liquid and filter aid will pass along lines 54 and 58 into recirculation chamber 22 as denoted by arrows 90 and 92 (FIG. 3). During this cycle, dirty liquid in the top portion of the filter 30 and the inlet line 32 downstream of inlet valve 40 will be forced to flow into chamber 22 by the admission of compressed air through line 42 to the top of the filter. Some of the filter aid on the filter medium in the filter will be dispersed by this reverse flow and will be returned to chamber 22 through drain valve 56 along with any particulates remaining in the inlet piping. Dispersion and consequent suspension of collected particulates in chamber 22 is increased by the difficulty of timing the drain valve 56 to close at the precise moment when liquid in the top of the filter has been blown out. As a result, large amounts of air are introduced in chamber 22 which further agitates the liquid putting even more particulates in suspension in chamber 22 as well as the dirty tank 20. During this cycle, the liquid level 91 in the dirty tank is at the upper margin of partition 14 causing some overflow (arrow 93) into clean tank 10. Since there is agitation in the dirty tank 20, some of the particulates overflow into the clean tank and pass through line 26 to process machinery, an undesirable result.

Figure 4:
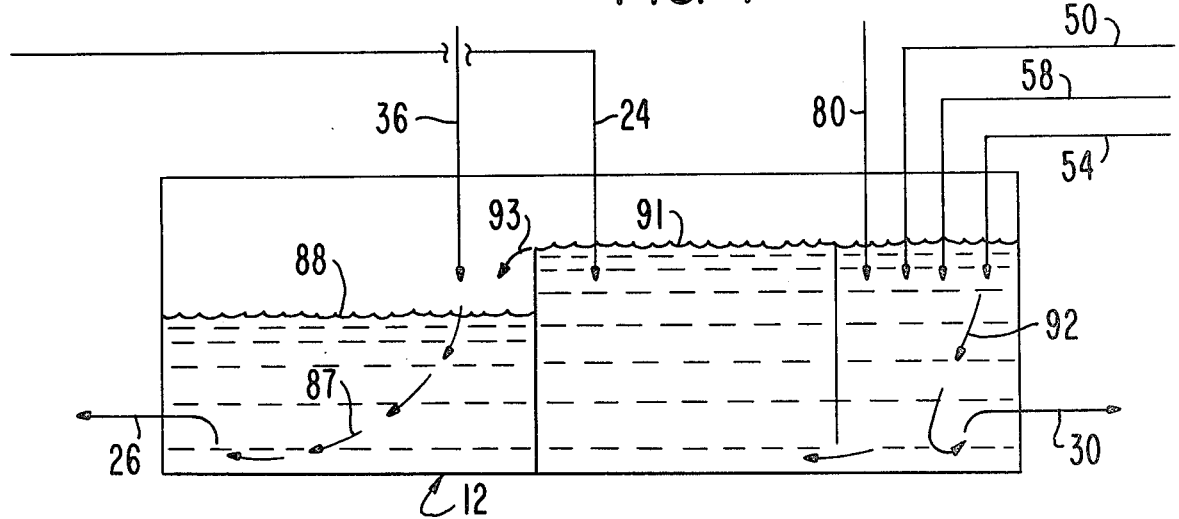
FIG. 4 is a view similar to FIGS. 1-3 but showing the flow through the divided storage tank during the final stage of the blowdown cycle.

FIG. 4 shows the condition of the liquid levels and liquid flows in tank 12 during the final blowdown cycle (FIG. 8) where the liquid remaining in the filter 30 and the outlet piping is forced through line 36, through outlet valve 38 and into clean tank 20 (arrows 87). When the liquid is evacuated from the filter, the compressed air remains on for whatever time is needed to dry the filter cake on the filter medium for discharge from the filter. During this cycle, dirty liquid will overflow partition 14 (arrow 93, FIG. 4) into the clean tank to permit continuous delivery of liquid to process through pump 28. The particulates put into suspension in the liquid in dirty tank 20 during the first stage of blowdown will now intermix with the liquid returning from process and will flow into the clean tank and then to the process machinery. This accounts for the increase in particulates in the flow to the process machinery during the filter cleaning cycle noted above. It is during the blowdown cycles (FIGS. 3 and 4) that particulates are undesirably allowed to pass into the clean tank and then to process through pump 28. This is an undesirable feature which the present invention has been designed to avoid and overcome.

The system of the present invention is broadly denoted by the numeral 100 and is shown in FIGS. 9-14. System 100 is the same in construction as system 10 of FIGS. 1-8 except that system 100 has an improved storage tank 102 provided with a clean tank 104, a dirty tank 106, and a third tank 108 comprised of an upper, blowdown chamber 110 and a lower, recirculation chamber 112. For purposes of illustration, tank 108 has a cylindrical side wall within dirty tank 106. Tank 108 also has a conical baffle 114 centrally located therein as shown in FIG. 10 and baffle 114 defines the bottom of blowdown chamber 110. A tubular member 116 extending downwardly from baffle 114 has a valve 118 therein for controlling the flow of fluid from blowdown chamber 110 to recirculation chamber 112.

Since all elements of system 110 are the same as corresponding ones of system 10 except for tank 102, the same numerals will be applied in system 100 which are common to the same elements as system 10.

Figure 12:
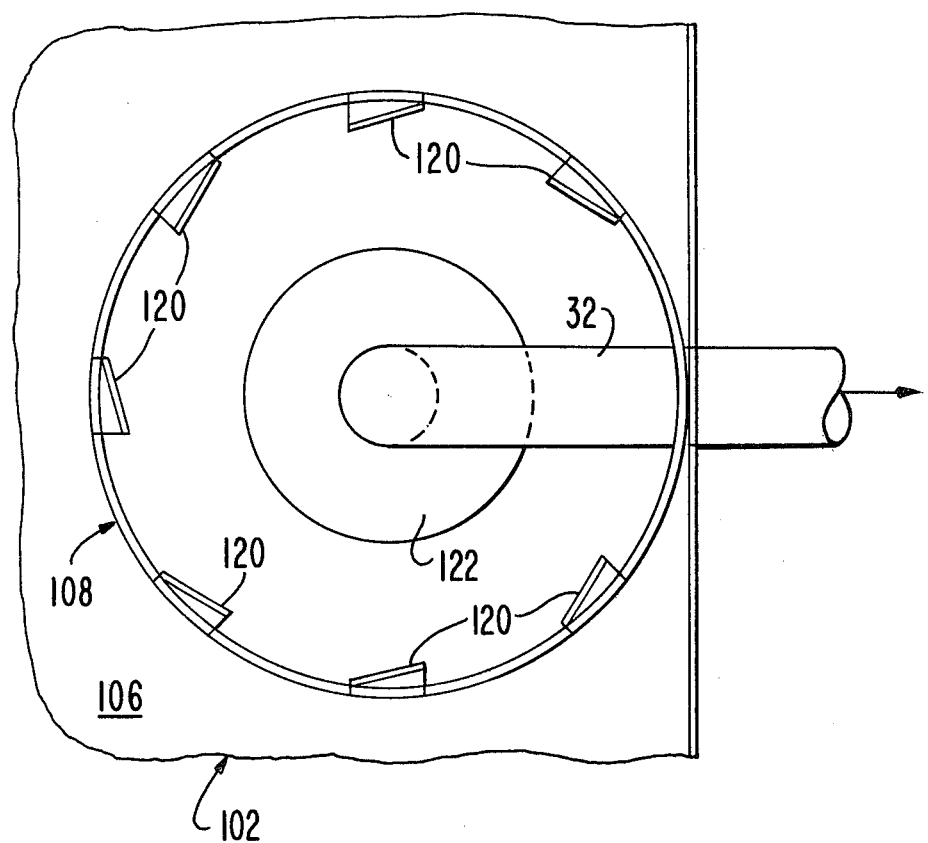
FIG. 12 is an enlarged cross-sectional view taken along line 12—12 of FIG. 10.

As shown in FIG. 10, line 32 communicates with the bottom of recirculation tank 112, the latter having tangential inlet ports 120 which are shown in more detail in FIG. 12. A vortex plate 122 surrounds the open inlet end of line 32. The purpose of ports 120 and plate 122 is to induce a cyclonic swirl of liquid in recirculation chamber 112 which will return all suspended and settled out particulates from dirty tank 106 to filter 30 during the pre-coat and filtration cycles of system 100.

Blowdown chamber 110 is coaxial with recirculation chamber 112 and has lines 54 and 50 communicating therewith tangentially thereof as shown in FIGS. 10 and 11. This assures that particulates will not gravitate to and adhere on the inner conical surface of baffle 114 during and after the blowdown cycles. Moreover, during the blowdown cycles, valve 118 is closed as shown in FIG. 10 so that particulates discharged from the filter during the first stage of blowdown are kept in chamber 110 and are prevented from collecting in the recirculation chamber 112 which would otherwise allow the particulates possibly to pass into the dirty tank through tangential inlet ports 120.

Figure 13:
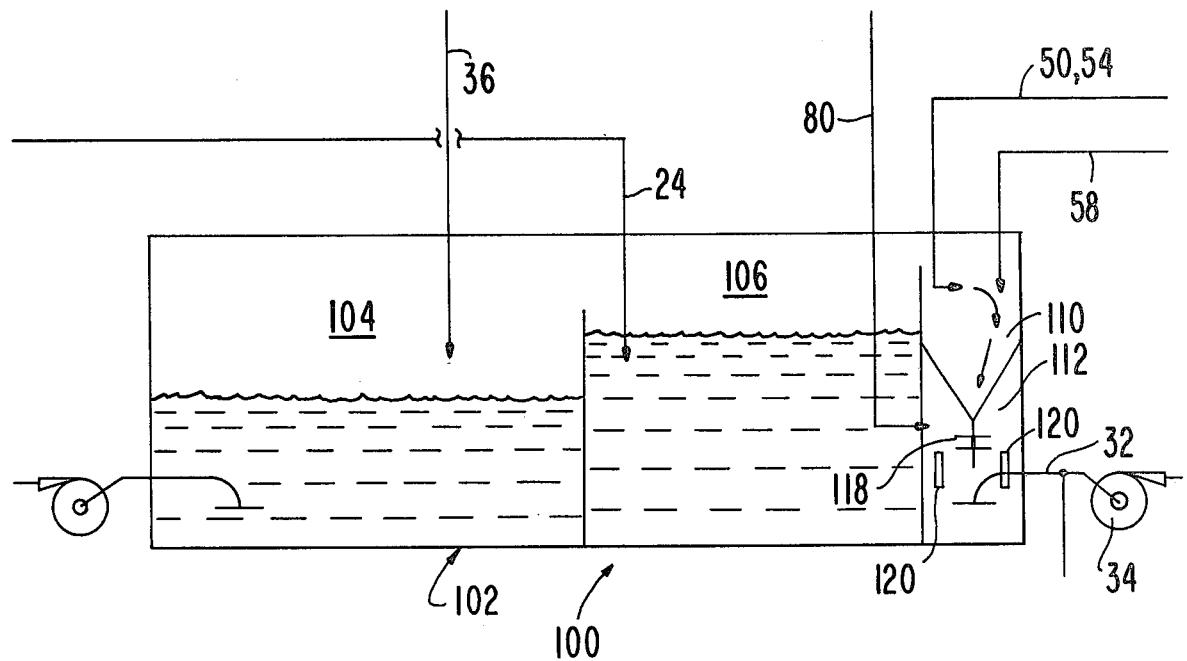
FIG. 13 is a fragmentary view similar to FIG. 9 but showing the improved storage tank of the present invention during the pre-coat and filtration cycles.

FIG. 13 shows the liquid levels and liquid flows in chamber 102 during the pre-coat and filtration cycles. During these cycles, valve 118 is open so that blowdown chamber 110 is in fluid communication with recirculation chamber 112. Also, the suction force provided in line 32 by filter pump 34 causes a swirling action in recirculation chamber 12 because liquid is drawn in from dirty tank 106 to chamber 112 and then outwardly through line 32 through filter 34 and inlet valve 40 to filter 30. The swirling action is denoted by the curved arrow 130 of FIG. 13.

During the pre-coat and filtration cycles, all blowdown and operating particulates will be effectively isolated from dirty tank 106 and will be returned to recirculation chamber 112 for flow through the filter. Thus, the particulates will be kept in suspension in chamber 112 by the cyclonic swirl therein for return to the filter through the filter pump 34. By directing liquid from the bleed line 50 and the eductor line 54 tangentially of baffle 114, a second cyclonic swirl in blowdown chamber 110 will prevent the buildup of particulates therein, and these particulates will gravitate through member 116 past open valve 118 into recirculation chamber 112 during the pre-coat and filtration cycles. Any overflow from dirty tank 106 into clean tank 104 will not result in particulates entering the clean tank because the particulates are not in suspension in the liquid in the clean tank.

Figure 14:
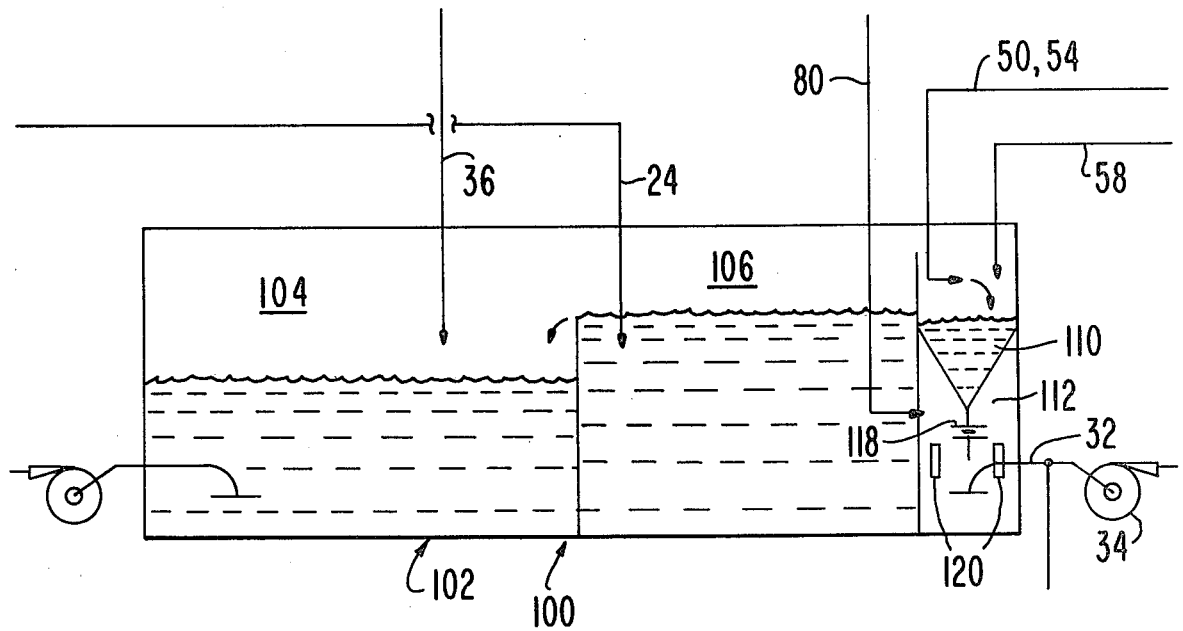
FIG. 14 is a view similar to FIG. 13 but showing the flows in the improved storage tank of the present invention during the initial and final blowdown cycles.

During the initial and final stages of blowdown, valve 118 is closed as shown in FIG. 14. During these cycles, blowdown liquid will be returned to and retained in blowdown chamber 110. In the final blowdown cycle, clean liquid will be forced out of filter 30 and along line 36, past outlet valve 38 and into the clean tank. During this time, the blowdown chamber 110 will be kept isolated from the dirty tank so that particulates in the blowdown chamber cannot reach and flow into the dirty tank at all. Any incoming process liquid (dirty liquid) may tend to overflow the dirty tank. However, only a slight amount of dirt, if any, in the dirty liquid in the dirty tank will overflow into the clean tank. Any particulates from the incoming dirty liquid will gravitate toward the bottom of the dirty tank and will have no chance to pass by overflow into the clean tank. The reason for this is that the dirty tank is essentially quiescent even though filter pump 34 may be operating so that there is low volume flow into recirculation chamber 112 from dirty tank 106 through ports 120. Moreover, none of the incoming air and liquid to the blowdown chamber has any chance of affecting the liquid in the dirty tank; thus, there will be substantially no contamination of the clean tank by any dirt from the dirty tank 106. In this way, the problems associated with the prior systems as mentioned above with respect to FIGS. 1-8 are avoided and clean process liquid will flow out of the clean tank substantially at all times through pump 28.

We claim:

1. In a filtration system for use with process machinery and having a filter provided with a filter inlet line, a filter outlet line and a filter blowdown line, the improvement comprising: a storage tank unit having a first tank adapted to be coupled to the filter outlet line for receiving clean liquid therefrom and a second tank for receiving dirty liquid from process machinery, said tank unit having a partition separating the first and second tanks from each other, the partition being at a height to allow liquid from one tank to overflow into the other tank; means in the tank unit for defining a pair of vertically spaced chambers adjacent to the second tank, the upper of the chambers adapted to be coupled to the filter blowdown line and the lower of the chambers adapted to be coupled to the filter inlet line; a valve between the chambers for permitting the chambers to be selectively placed in fluid communication with each other, the upper of the chambers being out of fluid communication with the first and second tanks, the lower chamber being in fluid communication with the second tank, whereby particulates in the upper chamber will pass into the lower chamber and out of the same toward the filter inlet line in bypassing relationship to the second tank when the valve is open and when liquid flows from the lower chamber to the filter line.

2. In a system as set forth in claim 1, wherein the tank unit has a wall defining the sides of the chambers, said upper chamber having a bottom provided with an opening therethrough, the valve being across the opening for controlling the fluid flow therethrough.

3. In a system as set forth in claim 1, wherein the tank unit has a side wall defining the sides of the lower chamber, the side wall having a plurality of ports therethrough placing the dirty tank in fluid communication with the lower chamber, the ports extending tangentially of the outer periphery of the lower chamber to allow a swirling action of liquid in the lower chamber when fluid flows from the second tank through the ports and into the lower chamber and then out of the lower chamber toward the filter inlet line.

4. In a system as set forth in claim 3, wherein is included a conical baffle at the upper end of the lower chamber, said baffle defining the bottom of the upper chamber, there being a tubular member extending downwardly from the bottom of the baffle, said valve being in the tubular member.

5. In a system as set forth in claim 3, wherein is included a vacuum eductor line adapted to be coupled to the filter, said eductor line being coupled to the side wall and extending tangentially of the outer periphery of the upper chamber and in fluid communication with the upper chamber.

6. In a system as set forth in claim 3, wherein said ports are below the valve.

7. In a method of filtering process liquid in a system having a filter operable in pre-coat, filtration and blowdown cycles, the improvement comprising: directing dirty process liquid into a first region adjacent to a second region for receiving clean liquid from the filter; providing a first chamber adjacent to the first region and in fluid communication therewith; pumping process liquid from the first chamber to the filter during the pre-coat and filtration cycles; allowing clean liquid from the filter to flow into the second region during the filtration cycle; allowing liquid and particulate material from the filter to flow into a second chamber adjacent to the first chamber during the pre-coat and filtration cycles, said first and second chambers being in fluid communication with each other during the pre-coat cycle; blocking fluid communication between the chamber during the blowdown cycles; and creating a cyclonic liquid action in said first chamber during the pre-coat and filtration cycles.

8. In a method as set forth in claim 7, wherein the second chamber is above the first chamber, the liquid and particulates in the upper chamber gravitating into the lower chamber when the chambers are in fluid communication with each other.

9. In a method as set forth in claim 7, wherein the liquid from the first region enters the first chamber tangentially of the outer periphery of the first chamber to create the cyclonic liquid action in the first chamber to thereby prevent particulate material from passing from the first chamber into the first region.

10. In a method as set forth in claim 9 wherein the liquid in the first region is in a quiescent state during the pre-coat, filtration and blowdown cycles.

* * * * *